(12) United States Patent
Zhang et al.

(10) Patent No.: US 12,406,257 B2
(45) Date of Patent: Sep. 2, 2025

(54) VERIFYING DATA INTEGRITY OF DATA STORED IN BLOCK-LEVEL DATA STORAGE ACROSS MULTIPLE BLOCKCHAINS

(71) Applicant: Coinbase, Inc., Oakland, CA (US)

(72) Inventors: Jie Zhang, Bellevue, WA (US); Zhicong Liang, Bellevue, WA (US); Wangwang Zhou, Issaquah, WA (US)

( * ) Notice: Subject to any disclaimer, the term of this patent is extended or adjusted under 35 U.S.C. 154(b) by 92 days.

(21) Appl. No.: 18/537,657

(22) Filed: Dec. 12, 2023

(65) Prior Publication Data

US 2025/0190986 A1  Jun. 12, 2025

(51) Int. Cl.
G06F 16/00 (2019.01)
G06Q 20/38 (2012.01)
G06Q 20/40 (2012.01)

(52) U.S. Cl.
CPC ......... *G06Q 20/401* (2013.01); *G06Q 20/389* (2013.01)

(58) Field of Classification Search
CPC .. G06F 16/1824; G06F 16/9014; G06F 21/33; G06F 21/53; G06F 21/64; G06F 21/34; G06F 21/645; G06F 21/31; G06F 21/32; G06F 21/602; G06F 16/27; G06F 3/064; G06F 16/2228; H04W 80/02; H04W 4/80; H04W 12/66; H04W 12/086; H04W 88/16; H04W 4/70; H04W 12/04; H04W 12/06; H04L 9/0643; H04L 9/0637; H04L 9/3236; H04L 9/0897; H04L 9/50; H04L 9/3247; H04L 9/3268; H04L 9/3231; H04L 9/3252; H04L 9/14; H04L 9/3066; H04L 63/0861; H04L 9/3249; H04L 9/30; H04L 9/3239; H04L 9/302; G06Q 20/3827; G06Q 20/401; G06Q 20/065; G06Q 20/38215; G06Q 30/0185; G06Q 20/4016; G06Q 20/4014; G06Q 20/3825; G06Q 20/3276; G06Q 20/02; G06Q 20/06; G06Q 20/3678; G06Q 20/40145; G06Q 20/363; G06Q 20/3672; G06Q 20/3674; G06Q 20/3227;

(Continued)

(56) References Cited

U.S. PATENT DOCUMENTS

| | | | |
|---|---|---|---|
| 9,679,276 B1 * | 6/2017 | Cuende | G06Q 20/3827 |
| 10,348,484 B2 * | 7/2019 | King | H04L 9/3247 |
| 10,693,839 B2 * | 6/2020 | Cleaver | H04L 63/0428 |

(Continued)

*Primary Examiner* — Yicun Wu
(74) *Attorney, Agent, or Firm* — Holland & Hart LLP

(57) ABSTRACT

Methods, systems, and devices for data management are described. A custodial token platform may obtain, by a blockchain data storage service and from first services that support at least one blockchain node of a blockchain network, data of a data block stored by the blockchain network. The blockchain data storage service may verify, using verification algorithms associated with the blockchain network, the data of the data block. The blockchain data storage service may store, after verifying the data, the data of the data block in a storage location. The blockchain data storage service may receive, from a second service, a request for the data of the data block and verify, using at least one of the verification algorithms, the data of the data block as stored in the storage location. The custodial token platform may provide the data to the second service after verifying the data of the data block.

20 Claims, 10 Drawing Sheets

(58) Field of Classification Search
CPC ............... G09C 1/00; G06K 19/06028; G06K 19/06037
See application file for complete search history.

(56) References Cited

U.S. PATENT DOCUMENTS

| | | | |
|---|---|---|---|
| 11,050,763 B1* | 6/2021 | Lyle | H04L 9/3239 |
| 2016/0098723 A1* | 4/2016 | Feeney | G06Q 20/065 |
| | | | 705/75 |
| 2016/0162897 A1* | 6/2016 | Feeney | H04L 9/3236 |
| | | | 705/71 |
| 2016/0330027 A1* | 11/2016 | Ebrahimi | H04L 9/3066 |
| 2018/0308098 A1* | 10/2018 | Ebrahimi | H04L 9/3268 |
| 2019/0208414 A1* | 7/2019 | Roennow | G06F 16/1824 |
| 2019/0268138 A1* | 8/2019 | Mankovskii | G06Q 20/065 |
| 2020/0265418 A1* | 8/2020 | Lee | G06Q 20/40145 |

\* cited by examiner

VERIFYING DATA INTEGRITY OF DATA STORED IN BLOCK-LEVEL DATA STORAGE ACROSS MULTIPLE BLOCKCHAINS

FIELD OF TECHNOLOGY

The present disclosure relates generally to data management, including techniques for verifying data integrity of data stored in block-level data storage across multiple blockchains.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

A data storage service in which data from internal or external services may be stored and provided to other services, such as a client application accessible by a user. For example, the data storage service may store data provided from a first party related to or associated with the client application, or a third party unrelated to the client application. The first party and/or the third party may support nodes of a blockchain network, where the nodes manage (e.g., verify) one or more data blocks of a blockchain supported by the blockchain network. The client application may request data (e.g., based on input by users), and the client application may retrieve the requested data from the data storage service to provide to the user. However, the client application may not support a validation of the data provided to the user, especially in cases where the data is retrieved from the third party. For example, the third party may provide corrupt or inaccurate data to the client application. Further, the user may not trust the data of the data storage service. In other words, without data validation, the client application, the third parties, and the user may not trust a validity of the data stored or provided by the data storage service.

As described herein, the data storage service may support verification of the data (e.g., blockchain data) after retrieving the data from the internal or external services and before providing the data to another service, such as a client application. That is, the data storage service may verify that data received from a service is valid before storing the data and also verify the data stored at the data storage service (e.g., internally) before serving the data. For example, the data storage service may verify the data by using a verification algorithm associated with a blockchain network. The verification algorithm may involve reconstructing (e.g., recalculating, replicating, etc.) a cryptographic hash of a data block including the data. In some examples, the verification algorithm may vary according to a blockchain network from which the data originated. For example, the verification algorithm may vary according to a structure of a data block on the blockchain network. These and other techniques are described in further detail with respect to the figures.

Figure 1:
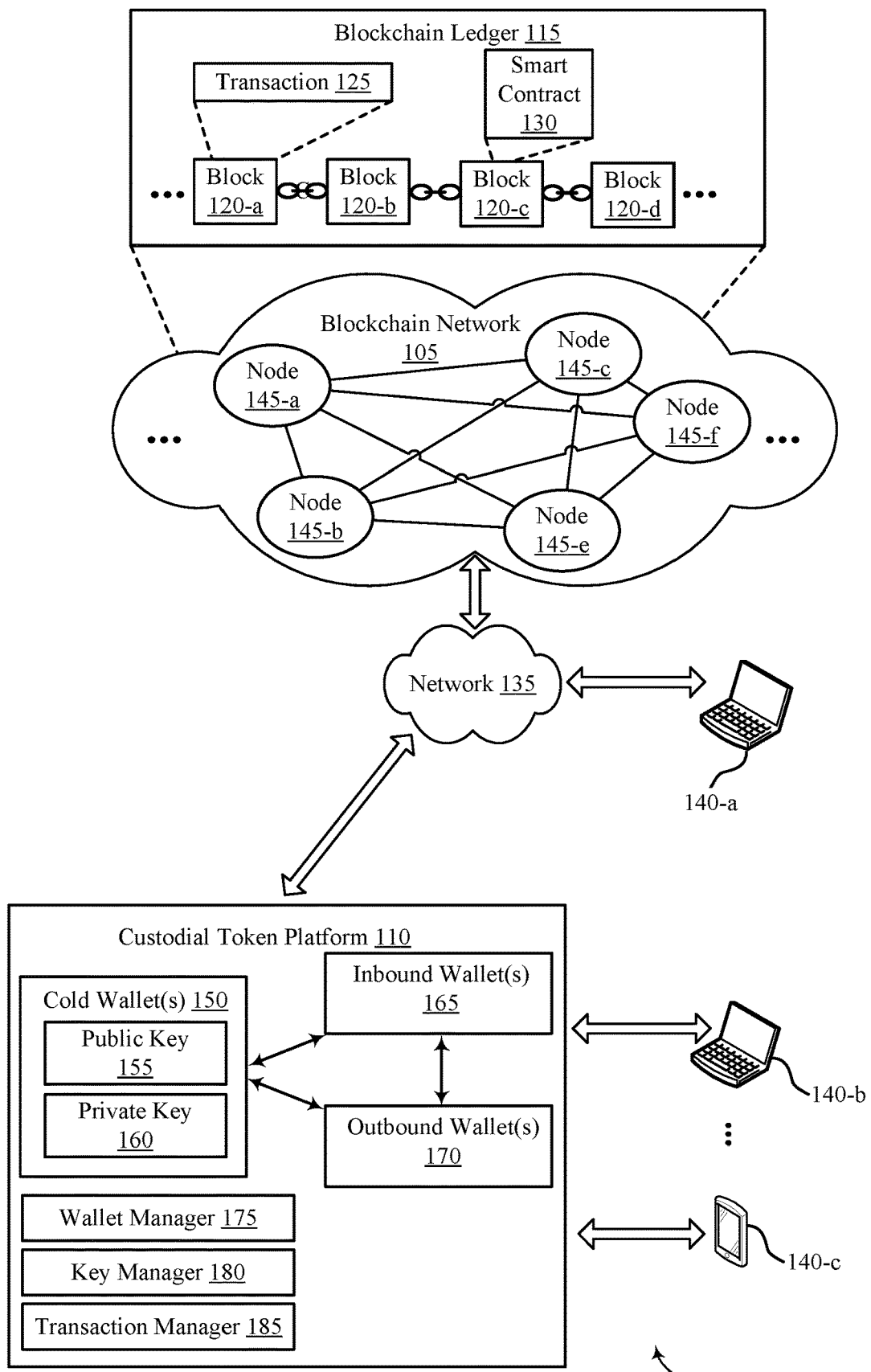
FIGS. 1 and 2 show examples of computing environments that support verifying data integrity of data stored in block-level data storage across multiple blockchains in accordance with aspects of the present disclosure.

FIG. 1 illustrates an example of a computing environment 100 that supports verifying data integrity of data stored in block-level data storage across multiple blockchains in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-a may provide user inputs via the computing device 140-a, which may result in commands, data, or any combination thereof being communicated via the network 135 to the custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc.

In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

An application, such as a client application on the computing device 140 and/or an application of the custodial token platform 110, may access a data storage service. The data storage service may be a service provided by the custodial token platform 110 and/or may be accessed by the custodial token platform. The data storage service may receive data (e.g., blockchain data) from internal or external services, store the data, and provide the data to other services/applications. The data storage service may verify the data before storing the data and/or before providing the data to the other services. For example, the data storage service may verify the data via a verification algorithm associated with a blockchain network from which the data originated. That is, the data may be from a data block stored on a blockchain network (e.g., blockchain network 105).

For example, the data storage service may be implemented by the custodial token platform 110 and may support various services supported by the custodial token platform 110 such as wallet the wallet manager 175, key manager 180, transaction manager 185, or the like. That is, the data provided by the data storage service of the custodial token platform may be used by other services within the custodial token platform. In some examples, the wallet manager 175 or an associated system or service may access the blockchain data provided by the data storage service to display a balance for a user wallet, such as one of the inbound wallets 165. The data storage service may also support balance details for self-custody wallets. Additionally, or alternatively, the blockchain data may be used by other services such as an exchange, payment system, or the like to provide balance details for blockchain wallets. In some cases, custodial token platform 110 may maintain a blockchain node 145-*b* (e.g., a first party service) and the blockchain data may be obtained from the blockchain node 145 and verified as described herein. Additionally, or alternatively, the blockchain data may be obtained from a third party service that maintains or implements a blockchain node 145. Because the blockchain data may be retrieved from various services and may be use by various services and systems, it is desirable that the blockchain data be accurate and verifiable.

Verification of the blockchain data after receipt from the services and before providing to a user may support multiple advantages. Verifying the data as it is ingested by the data storage service and before serving ensures that data (e.g., a balance) provided to a user and to other services is accurate. For example, a user may wish to see an accurate balance to perform various blockchain related tasks, and the custodial token platform may use accurate balances to perform services such as exchange related services or peer to peer payment services. Additionally, the data verification, as it is based on a verification algorithm associated with a blockchain network (e.g., blockchain network 105), may be replicated by a user or another service to ensure validity of an infrastructure of the client application and/or the data storage service. In other words, an end-user may verify the integrity of the data storage service by replicating the verification algorithm. The verification of data via the data storage service may also support and increase a level of trust between applications and external or third party services, as the validity of data exchanged may be verified. External or third party services may be associated with one or more advantages when compared to, for example, internal or first party services, as maintenance of complete blockchain data to provide such data may be associated with extensive processing and resource overhead. That is, maintenance of a full blockchain node may use extensive processor, memory, and other resources (e.g., power resources to cool the nodes). Accordingly, a service that uses the data (e.g., the custodial token platform 110) may offload tasks and resource overhead, such as blockchain data generation and live block data verification tasks, to external services while maintaining data trust by implementing the verification methods described herein.

Figure 2:
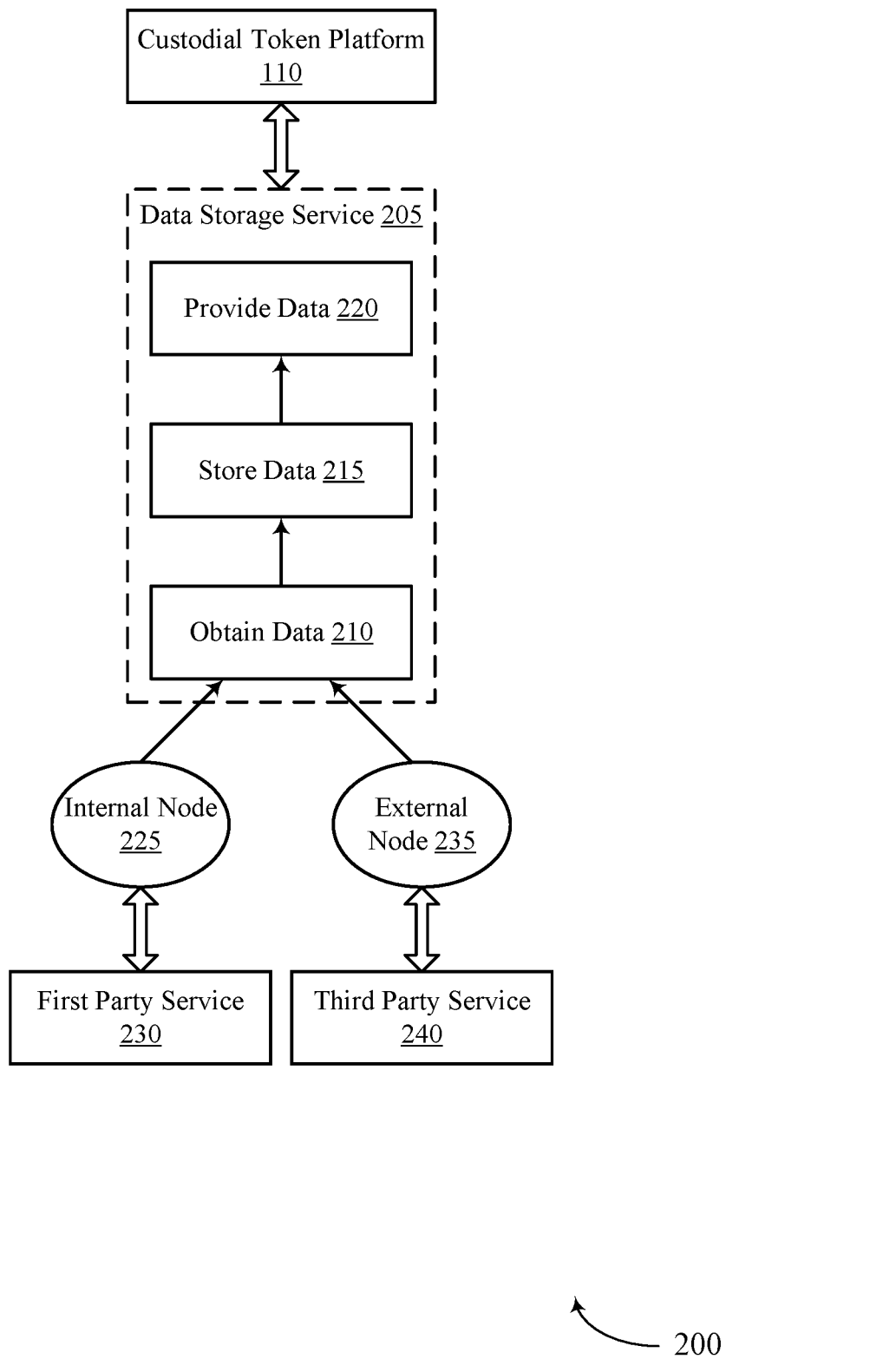

FIG. 2 shows an example of a computing environment 200 that supports verifying data integrity of data stored in block-level data storage across multiple blockchains in accordance with aspects of the present disclosure. The computing environment 200 may include a custodial token platform 110 which may be examples of corresponding devices as described with reference to FIG. 1. The computing environment 200 may also include a data storage service 205, which may be supported by or accessed by the custodial token platform 110 as described with reference to FIG. 1.

As described with respect to FIG. 2, the data storage service 205 may be one of multiple services accessible via the custodial token platform 110. The data storage service 205 may obtain data 210, store data 215, and/or provide data 220. For example, the data storage service 205 may obtain the data 210 (e.g., blockchain data) from an internal node 225 supported by a first party service 230 and/or from an external node 235 supported by a third party service 240.

For example, the first party service 230 and the third party service 240 may each support or otherwise be associated with the internal node 225 and the external node 235, respectively. The internal node 225 and the first party service 230 may be associated with (e.g., supported by) the custodial token platform 110, while the external node 235 and the third party service may be unassociated with the custodial token platform 110. The internal node 225 and the external node 235 may be nodes on a first blockchain network and a second blockchain network, respectively. That is the internal node 225 and the external node 235 may be nodes (e.g., nodes 145 of FIG. 1) of the same blockchain or different blockchains. The internal node 225, the external node 235, or both may store and maintain copies of a blockchain ledger of a respective blockchain network. Maintaining data of a blockchain network may involve verifying transactions, performing consensus techniques, generating blocks, and/or appending blocks to the blockchain ledger.

The data storage service 205 may obtain the data 210 (e.g., blockchain data) from the internal node 225 and/or the external node 235 via the first party service 230 and the third party service 240, respectively. For example, the data storage service 205 may request the data from the first party service 230 and/or the third party service 240, where the first party service 230 and/or the third party service 240 may, based on receiving the request, pull the data from the respective nodes and respond to the request. In other words, the data storage service 205 may use the first party service 230 and/or the third party service 240 to pull the data from blockchain nodes, such as the internal node 225 and/or the external node 235.

In some examples, the data storage service 205 may obtain the data 210 from the internal node 225 and/or the external node 235 by sending multiple API calls. For example, the data storage service 205 may transmit the multiple API calls to a same service (e.g., the first party service 230 or the third party service 240) to extract portions of data from a data block, which may be an example of a block of a blockchain network. As described in further detail herein, a data block of a blockchain may include a set of transactions, a header, etc., and each API call may extract a different portion of the data block, such as a first API call for the transaction data and a second API call for the block header. The multiple API calls may vary according to a blockchain network on which the data is stored. That is, a quantity of API calls to extract the data may vary based on a structure of a data block or a protocol of the blockchain network. In other words, the data storage service 205 may transmit the API calls based on a blockchain network storing the data block.

The data storage service 205 may obtain the entire data block (e.g., as opposed to a payload of the data block) to verify the data of the data block. For example, a verification algorithm may involve one or more portions of the data block (e.g., or the entire data block) in addition to a payload including the data. As an example, the verification algorithm may involve verifying a cryptographic hash of a header of the data block.

After ingestion or receipt of the data, the data storage service 205 may verify the data obtained from the internal node 225 and/or the external node 235. For example, the data storage service 205 may, regardless of whether the node is internal or external, verify the data provided by the first party service 230 or the third party service 240. The verification process may involve verifying that a payload of the data (e.g., the data itself) is uncorrupted and also verifying that the data block is consistent with a record on the blockchain ledger.

For example, to verify the payload of the data, the data storage service 205 may recalculate a cryptographic hash of the data of the data block and compare the recalculated hash to a hash provided in a portion of the data block. In other words, the data storage service 205 may hash the data of the data block and compare the hash to the header of the data block (e.g., pulled via the API calls) to verify that the determined hash matches the hash recorded in the data block. That is, the data storage service 205 may verify an accuracy of the data. Verification of the cryptographic hash of the data may be described in further detail elsewhere herein, including with reference to FIGS. 3 and 4.

Additionally, or alternatively, the data storage service 205 may check that the blockchain ledger includes the data block. For example, the data storage service 205 may confirm that the data is actually (e.g., canonically) in the blockchain. In other words, the data storage service 205 may validate a block header of the data block. In some examples, the data storage service 205 may validate the block header using a consensus process. For example, the data storage service 205 may implement a consensus protocol to obtain a verified block header from the blockchain network associated with the data. In some examples, the data storage service 205 may also obtain the data block from the first party service 230 or the third party service 240 and verify the data block cryptographically. Additionally, or alternatively, the data storage service 205 may query one or more node providers to obtain a consensus of valid block headers. In some examples, the data storage service 205 may verify irreversible blocks (e.g., such that the probability of storing a non-canonical data block is relatively low).

In some examples, the data storage service 205 may verify data received from multiple nodes in parallel. That is, the data storage service 205 may obtain data from multiple data blocks and/or multiple services in parallel and perform the verification for the data simultaneously. Additionally, or alternatively, the data storage service 205 may continuously update or synchronize with respective blockchains associated with the obtained data. In other words, the data storage service 205 may be an unencrypted mirror of the encrypted data stored on the blockchain network. For example, the data storage service 205 may update stored data by transmitting the API calls and performing the verification (e.g., again, or on a periodic basis).

The data storage service 205 may store the data 215 after completing the verification. For example, the data storage service 205 may store data which has been verified, and, in some examples, may refrain from storing data which is not verified successfully.

The data storage service 205 may provide the data 220 after receiving a request for the data. For example, the data storage service 205 may receive the request for the data from a client, such as a user application or a client service within the custodial token platform 110. Thus, a client may be a user of the custodial token platform 110, another service supported by the custodial token platform 110, an external service, or the like. In some examples, the data storage service 205 may verify the stored data before providing the data 220. For example, the client requesting the data may opt in to or opt out of verifying the data as stored by the data storage service 205. Additionally, or alternatively, the client may opt to verify the data themselves, for example, via a software development kit (SDK) of the data storage service 205 at the client side. If the client opts in to verifying the data at the data storage service 205, the data storage service 205 may verify the data as stored to check that data stored is not corrupted, to check for security breaches, or the like.

The data storage service 205 may verify the data in a same or similar manner as the verification is performed when the data is obtained. That is, the data storage service 205 may verify that a payload of the data (e.g., the data itself) is uncorrupted and also verify that the data block is consistent with a record on the blockchain ledger. In other words, the data storage service 205 may leverage various cryptographic hashes stored inside each data block and repeat the cryptographic calculation to determine that the data block is not modified or corrupted both after it is obtained by the data storage and before it is provided to a client. The cryptographic calculation may vary according to the blockchain network storing the data block.

Figure 3:
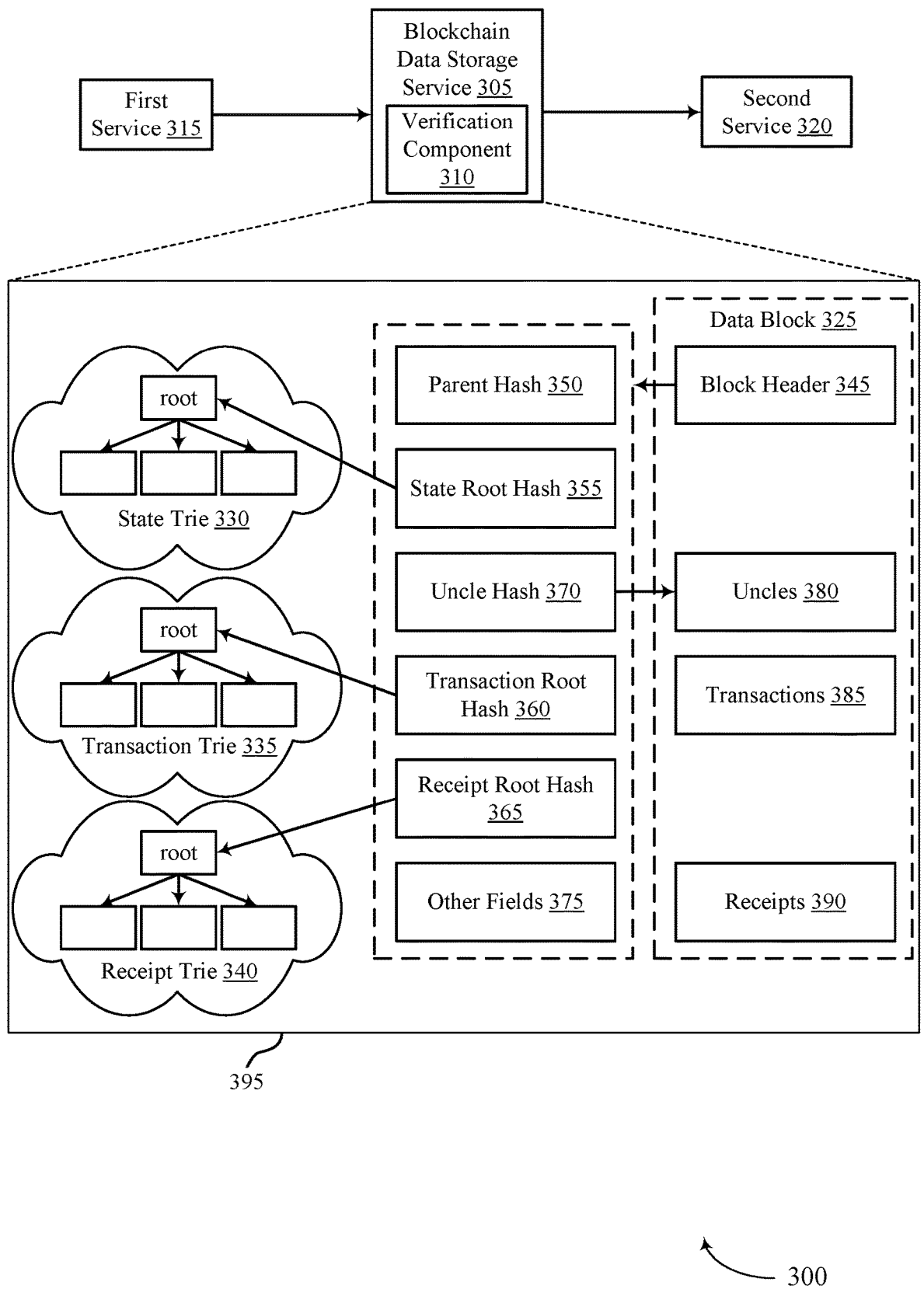
FIGS. 3 and 4 show examples of verification structures that support verifying data integrity of data stored in block-level data storage across multiple blockchains in accordance with aspects of the present disclosure.

FIG. 3 shows an example of a computing system 300 that supports verifying data integrity of data stored in block-level data storage across multiple blockchains in accordance with aspects of the present disclosure. The computing system 300 may include a blockchain data storage service 305 including a verification component 310, and the blockchain data storage service 305 may be an example of the data storage service 205 as described with reference to FIG. 2. The computing system 300 may also include a first service 315, which may be an example of the first party service 230 or the third party service 240 as described with reference to FIG. 2.

The blockchain data storage service 305 may obtain data from the first service 315 and verify the data via the verification component 310. For example, the blockchain data storage service 305 may perform a verification using a verification structure 395 before storing the data and before providing the data to a second service 320. The second service 320 may request the data from the blockchain data storage service 305, or, in some examples, request the data from a custodial token platform (e.g., the custodial token platform 110 as described with reference to FIG. 1 and FIG. 2) supporting the blockchain data storage service 305.

The verification component 310 may verify one or more aspects of the data. For example, the verification component 310 may verify a cryptographic hash of the data, an example of which is described in the verification structure 395. Additionally, or alternatively, the verification component 310 may verify a block header 345. For example, the verification component 310 may verify the block header 345 of a data block 325 according to a consensus process or algorithm.

The verification structure 395 (e.g., a blockchain ledger structure or block structure) described herein may represent an exemplary verification structure, and a verification structure implemented by the verification component 310 of the blockchain data storage service 305 may vary according to a blockchain or blockchain network supported by a node of the first service 315. That is, the first service may support the node of a first blockchain network such that the verification structure 395 described herein may be associated with or specific to blockchain protocols or a blockchain structure of the first blockchain network. In other words, the verification structure 395 may be based on the blockchain structure of the first blockchain network, and it may be understood that different verification structures may be applied according to a blockchain network associated with the data obtained by the blockchain data storage service 305.

In the example of the verification structure 395, the first blockchain network may support a blockchain structure including a Merkle Patricia Tree (MPT). The MPT may be understood as an in-memory structure to access data supporting relatively fast data query and Merkle proofs for a given key. For example, the verification component 310 may query nodes of the first blockchain network to retrieve data according to a key, which may represent a location on the MPT. In some examples, the key may be of a key-value pair stored in a key-value database.

The MPT may store hashes of all of nodes of the first blockchain network such that a root node may be cryptographically dependent on the internal data. In such examples, the root hash may be understood as a secure identifier of the MPT (e.g., the entire MPT). Further, updates in a new block of the first blockchain network may trigger a copy-on-write behavior, generating a new tree root. Accordingly, all previous states may be preserved in the blockchain, and the verification component 310 may retrieve the historical state for a given past block height.

The data block 325 stored on the first blockchain network may have a structure corresponding to the MPT. For example, the data block 325 may include hashes corresponding to at least three MPTs: a state trie 330, a transaction trie 335, and a receipt trie 340. The state trie 330 may store a status of an account. In some examples, the status of the account may include a nonce, balance, storage root hash, and/or a code hash. The transaction trie 335 may store indications of transactions of the data block 325, and the receipt trie 340 may store receipts of the data block 325. For example, the state trie 330 may be included in each block of a blockchain network (e.g., a global state) while the transaction trie 335 and the receipt trie 340 may be associated with the given data block 325.

A block header 345 of the data block 325 may include multiple block metadata fields, such as a parent hash 350 and several root hashes of tries, including a state root hash 355, a transaction root hash 360, and a receipt root hash 365. Additionally, or alternatively, the block header 345 may include an uncle hash 370 and one or more other fields 375. The block may also include uncles 380, transactions 385, and receipts 390.

Figure 4:
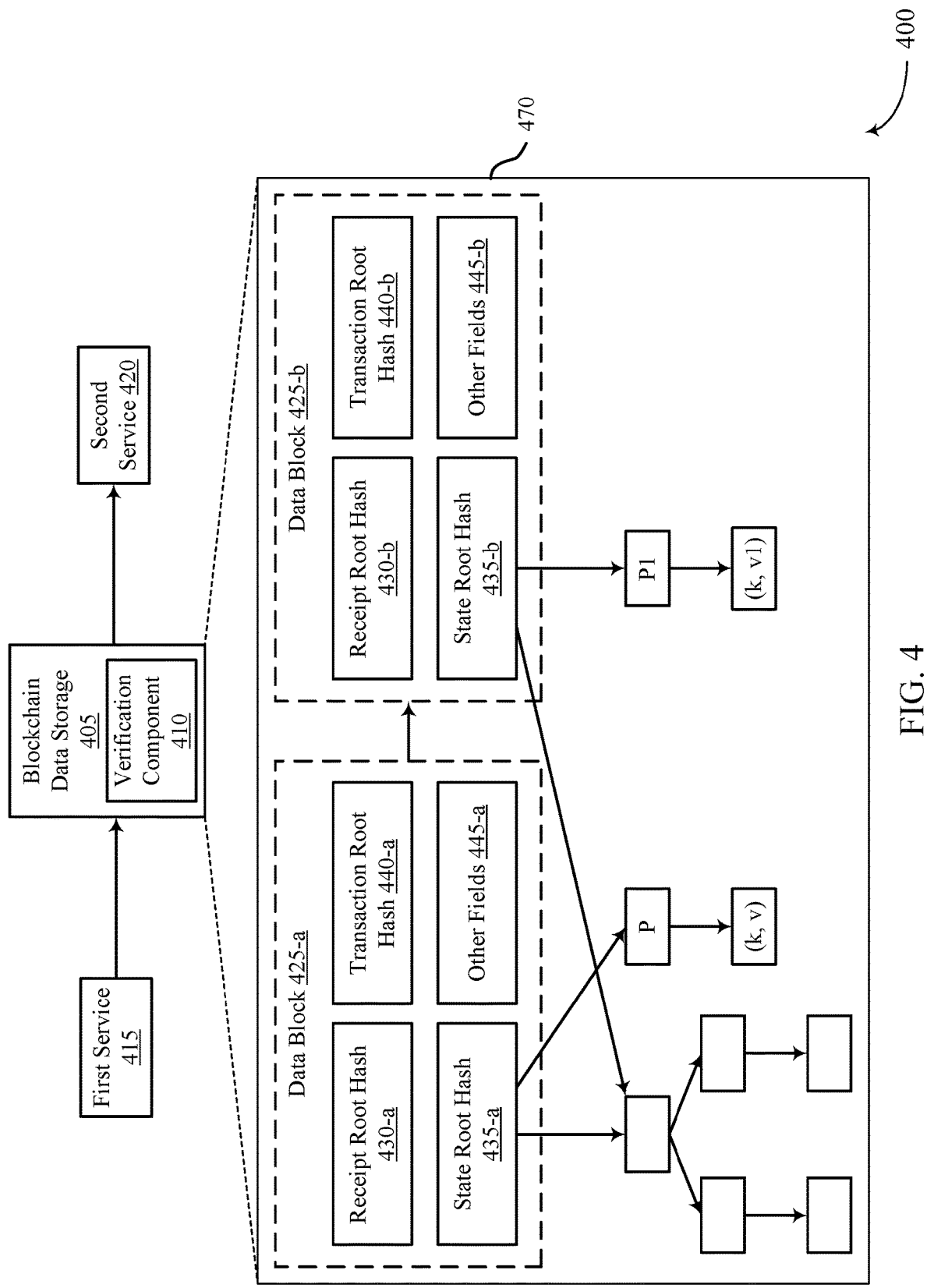

The verification component 310 may determine that the data block 325 is valid if it is internally consistent with the block header 345, the transactions 385, the receipts 390, and states (e.g., described in further detail elsewhere herein, including with reference to FIG. 4). The verification component 310 may repeat a cryptographic hash calculation process and compare the calculated hash with the hash stored in the data block 325.

For example, the verification component 310 may reconstruct the in-memory structure of the block header 345 and calculate the block header hash. That is, the verification component 310 may replicate a generation of the block header 345 by the first service 315. The verification component 310, after calculating the block header hash, may compare the calculated block header hash with the header hash stored in the data block 325. If the calculated block header hash matches the header hash stored in the data block 325, the block header 345 may be considered valid; otherwise, the block header 345 may be considered invalid.

After the verification component 310 verifies the block header 345, the verification component 310 may verify the transactions 385 and the receipts 390 of the data block 325. To verify the transactions 385 and/or the receipts 390, the verification component 310 may generate an empty MPT in memory and fill the empty MPT with the transactions 385 and/or the receipts 390. In other words, the verification component 310 may generate a transaction trie and a receipt trie based on the transactions 385 and the receipts 390, respectively, stored in the data block 325. The verification component 310 may calculate a root hash, such as a transaction root hash and/or a receipt root hash, from the generated MPT. After calculating the root hash, the verification component 310 may compare the respective calculated root hashes to the transaction root hash 360 and the receipt root hash stored in the data block 325. If the calculated root hash matches the root hash stored in the data block 325, the transactions 385 and/or receipts 390 may be considered valid; otherwise, the transactions 385 and/or receipts 390 may be considered invalid.

FIG. 4 shows an example of a computing system 400 that supports verifying data integrity of data stored in block-level data storage across multiple blockchains in accordance with aspects of the present disclosure. The computing system 400 includes a blockchain data storage service 405 including a verification component 410, and the blockchain data storage service 405 may be an example of the data storage service 205 as described with reference to FIG. 2. The computing system 400 may also include a first service 415, which may be an example of the first party service 230 or the third party service 240 as described with reference to FIG. 2.

The blockchain data storage service 405 may obtain data from the first service 415 and verify the data via the verification component 410. For example, the blockchain data storage service 405 may perform a verification according to the verification structure 470 before storing the data and before providing the data to a second service 420. The second service 420 may request the data from the blockchain data storage service 405, or, in some examples, request the data from a custodial token platform (e.g., the custodial token platform 110 as described with reference to FIG. 1 and FIG. 2) supporting the blockchain data storage service 405.

The verification component 410 may verify one or more aspects of the data. For example, the verification component 410 may verify a cryptographic hash of the data, an example of which is described in the verification structure 470. Additionally, or alternatively, the verification component 410 may verify a block header. For example, the verification component 310 may verify the block header of a data block 425-*a* or a data block 245-*b* according to a consensus protocol. The data blocks 425-*a* may be obtained from the first service 415, as described herein.

The verification structure 470 (e.g., a blockchain ledger structure or block structure) described herein may represent an exemplary verification structure, and a verification structure implemented by the verification component 410 of the blockchain data storage service 405 may vary according to a blockchain or blockchain network supported by a node of the first service 415. That is, the first service may support the node of a first blockchain network such that the verification structure 470 described herein may be associated with or specific to blockchain protocols or a blockchain structure of the first blockchain network. In other words, the verification structure 470 may be based on the blockchain structure of the first blockchain network, and it may be understood that different verification structures may be applied according to a blockchain network associated with the data obtained by the blockchain data storage service 405.

The data block 425-*a* and/or the data block 425-*b* stored on the first blockchain network may have a structure corresponding to an MPT. For example, the data block 425-*a* and the data block 425-*b* may each include at least a receipt root hash 430, a state root hash 435, a transaction root hash 440, and one or more other fields 445. The receipt root hash 430, the state root hash 435, and the transaction root hash 440 may represent root hashes of a receipt trie, a state trie, and a transaction trie, respectively. The verification component 410 may verify the receipt root hash 430 and the transaction root hash 440 by generating a replication of a receipt root hash and a transaction root hash, respectively, and comparing the replicated hashes to the receipt root hash 430 and the transaction root hash 440 included in the data block 425. The verification of the receipt root hash and/or the transaction root hash may be described in greater detail elsewhere herein, including with reference to FIG. 3.

The verification component 410 may validate the state root hash 435 in a different manner than, for example, the receipt root hash 430 and/or the transaction root hash 440, as a state trie from which the state root hash 435 is generated may maintain all account states for the first blockchain network. In other words, the state trie may represent a status of all accounts of the first blockchain network up to the given data block. In some examples, states or state changes may not be included in the data block 425-*a* and/or the data block 425-*b*. In the example of FIG. 4, a state of an account k may change from the block 425-*a* to the block 425-*b*, where the block 425-*b* may be created at a time after creation of the block 425-*a*. For example, the state root hash 435-*a* may indicate a state v1 while the state root hash 435-*b* may indicate a state v2. A new state root hash may be stored in a block header such that a state trie may be restored at full (e.g., archival) nodes (e.g., storing multiple terabytes of data). For example, a full node may store intermediate states of an account and may query historical account states for a block height (e.g., a block height of the data block 425-*a* or the data block 425-*b*). After a block header is verified, the verification component 410 may confirm that the state root hash 435 is correct.

The verification component 410 may verify the state root hash 435 using a Merkle proof. For example, the verification component 410 may verify an individual account state by requesting, from a full node (e.g., the first service 415), a tree related to the account. The full node may return a Merkle proof for the account including a path from a state trie root to a target leaf node storing an account state for the account. The verification component 410 may, using the Merkle proof and the state root hash 435, follow a path returned from the Merkle proof. If the account state is found at the target leaf node and if the account state is the same as an account state indicated by the state root hash 435, then the account state is considered to be valid by the verification component 410. As an example, the blockchain data storage service 405, before providing data to the second service 420 related to a balance of an account, may request the tree related to the account from the full node and verify a state of the account via the Merkle proof.

In some examples, the verification structure 470 may be implemented in addition to or alternatively from the verification structure 395. For example, the verification component 410 may verify the block header, the receipt root hash 430, and the transaction root hash 440 as described with reference to FIG. 3 and verify the state root hash 435 as described with reference to FIG. 4.

Figure 5:
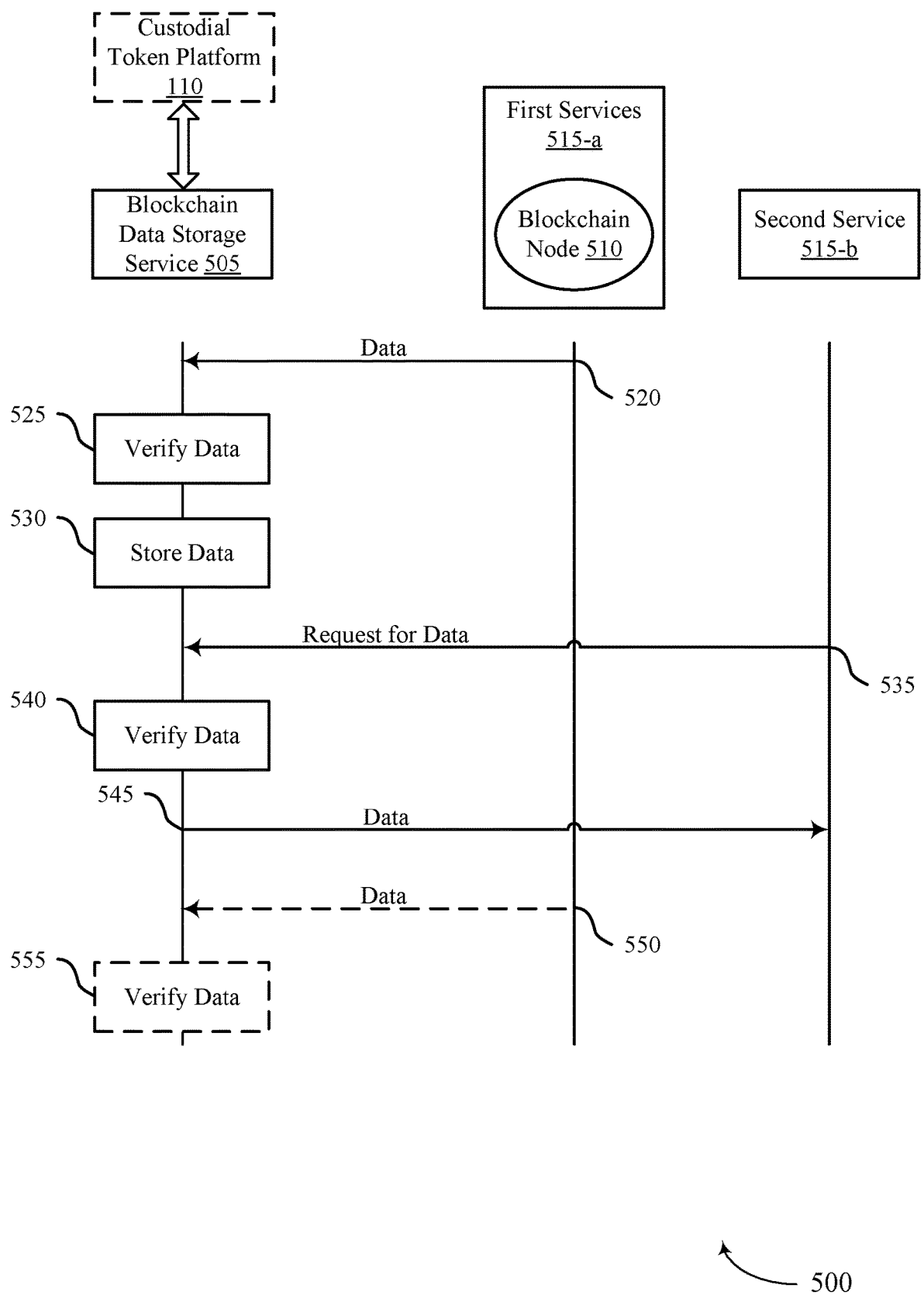
FIG. 5 shows an example of a process flow that supports verifying data integrity of data stored in block-level data storage across multiple blockchains in accordance with aspects of the present disclosure.

FIG. 5 shows an example of a process flow 500 that supports verifying data integrity of data stored in block-level data storage across multiple blockchains in accordance with aspects of the present disclosure. In some examples, the process flow 500 may implement or be implemented by aspects of the computing environment 100, the computing environment 200, the computing system 300, the computing system 400 as described with reference to FIGS. 1-4. For example, the process flow 500 may include a custodial token platform 110, a blockchain data storage service 505, a blockchain node 510, first services 515-*a*, and a second service 515-*b* which may be examples of corresponding devices as described with reference to FIGS. 1 and 2.

Alternative examples of the following may be implemented, where some steps are performed in a different order than described or are not performed at all. In some cases, steps may include additional features not mentioned below, or further steps may be added. Although the blockchain data storage service 505, the first services 515-*a*, and the second service 515-*b* are shown performing the operations of the process flow 500, some aspects of some operations may also be performed by one or more other devices or systems.

The custodial token platform 110, via the blockchain data storage service 505, may perform verification of data after receiving the data from a service, such as the first services 515-*a*, and/or before providing the data to a client, such as the second service 515-*b*. The custodial token platform 110 may manage the blockchain data storage service 505. In some examples, the first services 515-*a* may be a first party service or a third party service that supports a blockchain node that is configured to execute a blockchain protocol associated with the blockchain network.

At 520, the blockchain data storage service 505 may obtain data of a data block stored by a blockchain network. The blockchain data storage service 505 may obtain the data from the one or more first services 515-*a* supporting at least the blockchain node 510 of the blockchain network. In some examples, the blockchain data storage service may obtain the data by transmitting one or more API calls configured to extract respective portions of the data block to the one or more first services 515-*a*.

At 525, the blockchain data storage service 505 may verify the data. For example, the blockchain data storage service 505 may verify the data of the data block obtained from the one or more first services 515-*a* at 520 using multiple verification algorithms associated with the blockchain network. The multiple verification algorithms may include a header verification algorithm, a consensus algorithm, or the like.

At 530, the blockchain data storage service 505 may store the data. For example, the blockchain data storage service 505 may store, in a storage location, the data after verifying the data of the data block at 525 obtained from the one or more first services 515-*a* at 520.

At 535, the blockchain data storage service 505 may receive a request for the data of the data block from the second service 515-*b*. The second service 515-*b* may be an example of a wallet service supported by a custodial token platform, an end-user application, etc. that uses blockchain data to provide one or more other services.

At 540, the blockchain data storage service 505 may verify the data of the data block as stored in the storage location. For example, the blockchain data storage service 505 may verify the data using at least one of the multiple verification algorithms associated with the blockchain network. For example, the at least one algorithm may include a header verification algorithm.

In some examples, verifying the data at 525, at 540, or both may include verifying a header included in the data block and verifying that the data block is included in a blockchain ledger supported by a blockchain network. Verifying the header may include hashing transaction data of the data block and/or verifying that a resulting hash matches a hash value obtained from the header. Verifying the data at 525, at 540, or both may include the verification structures as described with reference to FIG. 3 and/or FIG. 4. That is, verifying the data at 525, at 540, or both may involve verifying the header of the data block, a transaction trie, a receipt trie, and/or a state trie.

In some examples, the blockchain data storage service 505 may obtain and verify data received from multiple blockchain networks and/or multiple services. As an example, the blockchain data storage service 505 may obtain, from a third service that supports a second blockchain node of a second blockchain network, second data of a second data block stored by the second blockchain network. The blockchain data storage service 505 may verify, using second multiple verification algorithms (e.g., different than the multiple verification algorithms used at 525 and/or at 540) associated with the second blockchain network, the second data. Additionally, or alternatively, the blockchain data storage service 505 may verify the second data after receiving a second request for the second data using at least one second verification algorithm of the second multiple verification algorithms associated with the second blockchain network storing the second data.

At 545, the blockchain data storage service 505 may provide the data to the second service 515-*b*. For example, the blockchain data storage service 505 may provide the data to the second service 515-*b* after verifying the data of the data block as stored in the storage location at 540.

At 550, the blockchain data storage service 505 may obtain data from the first services. The blockchain data storage service 505 may periodically obtain subsequent data blocks to the data block and stored by the blockchain network. After obtaining the subsequent data blocks at 550, the blockchain data storage service 505 may verify the data of the subsequent data blocks at 555 using the multiple verification algorithms associated with the blockchain network.

Figure 6:
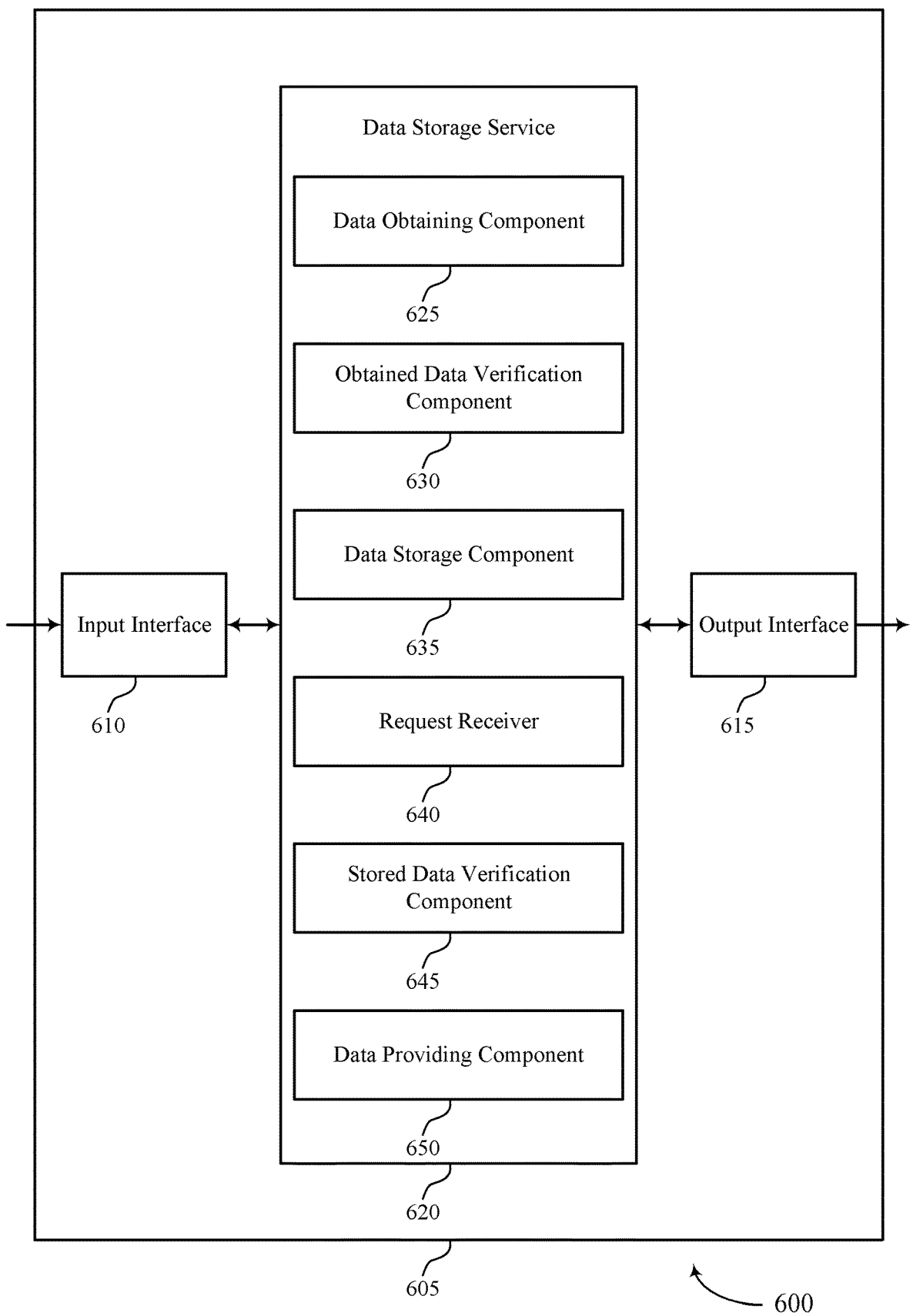
FIG. 6 shows a block diagram of an apparatus that supports verifying data integrity of data stored in block-level data storage across multiple blockchains in accordance with aspects of the present disclosure.

FIG. 6 shows a block diagram 600 of a system 605 that supports verifying data integrity of data stored in block-level data storage across multiple blockchains in accordance with aspects of the present disclosure. The system 605 may include an input interface 610, an output interface 615, and a data storage service 620. The system 605, or one or more components of the system 605 (e.g., the input interface 610, the output interface 615, and the data storage service 620), may include at least one processor, which may be coupled with at least one memory, to support the described techniques. Each of these components may communicate, directly or indirectly, with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the data storage service 620 to support verifying data integrity of data stored in block-level data storage across multiple blockchains. In some cases, the input interface 610 may be a component of a network interface 825 as described with reference to FIG. 8.

The output interface 615 may manage output signaling for the system 605. For example, the output interface 615 may receive signaling from other components of the system 605, such as the data storage service 620, and may transmit such output signaling corresponding to (e.g., representative of or otherwise based on) such signaling to other systems or devices. In some cases, the output interface 615 may be a component of a network interface 825 as described with reference to FIG. 8.

For example, the data storage service 620 may include a data obtaining component 625, an obtained data verification component 630, a data storage component 635, a request receiver 640, a stored data verification component 645, a data providing component 650, or any combination thereof. In some examples, the data storage service 620, or various components thereof, may be configured to perform various operations (e.g., receiving, monitoring, transmitting) using or otherwise in cooperation with the input interface 610, the output interface 615, or both. For example, the data storage service 620 may receive information from the input interface 610, send information to the output interface 615, or be integrated in combination with the input interface 610, the output interface 615, or both to receive information, transmit information, or perform various other operations as described herein.

The data storage service 620 may support data management in accordance with examples as disclosed herein. The data obtaining component 625 may be configured as or otherwise support a means for obtaining, by a blockchain data storage service and from one or more first services that support at least one blockchain node of a blockchain network, data of a data block stored by the blockchain network. The obtained data verification component 630 may be configured as or otherwise support a means for verifying, by the blockchain data storage service and using a plurality of verification algorithms associated with the blockchain network, the data of the data block obtained from the one or more first services. The data storage component 635 may be configured as or otherwise support a means for storing, after verifying the data of the data block obtained from the one or more first services, the data of the data block in a storage location. The request receiver 640 may be configured as or otherwise support a means for receiving, at the blockchain data storage service and from a second service, a request for the data of the data block. The stored data verification component 645 may be configured as or otherwise support a means for verifying, by the blockchain data storage service and using at least one of the plurality of verification algorithms associated with the blockchain network, the data of the data block as stored in the storage location. The data providing component 650 may be configured as or otherwise support a means for providing, after verifying the data of the data block as stored in the storage location, the data of the data block to the second service.

Figure 7:
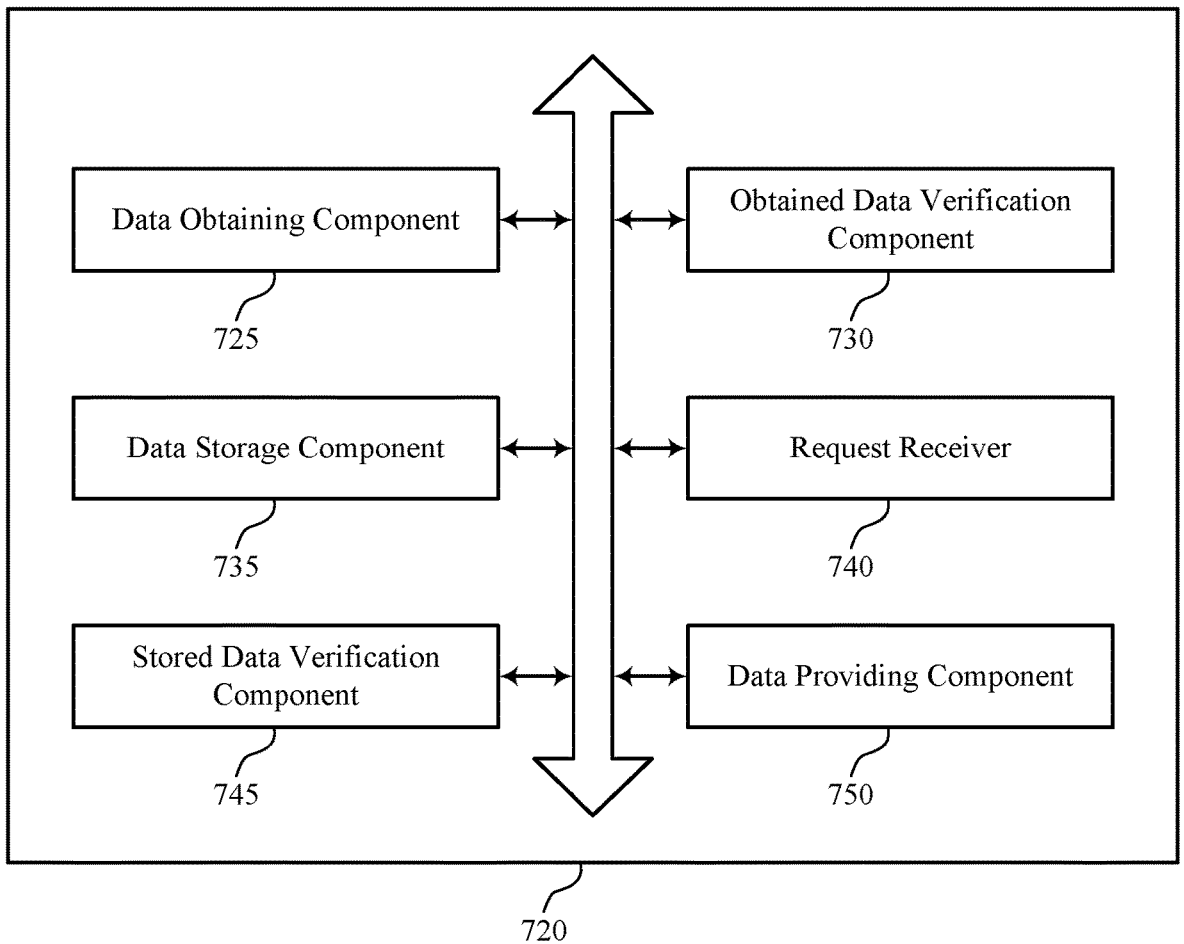
FIG. 7 shows a block diagram of a data storage service that supports verifying data integrity of data stored in block-level data storage across multiple blockchains in accordance with aspects of the present disclosure.

FIG. 7 shows a block diagram 700 of a data storage service 720 that supports verifying data integrity of data stored in block-level data storage across multiple blockchains in accordance with aspects of the present disclosure. The data storage service 720 may be an example of aspects a data storage service 620, a custodial token platform, or both, as described herein. The data storage service 720, or various components thereof, may be an example of means for performing various aspects of verifying data integrity of data stored in block-level data storage across multiple blockchains as described herein. For example, the data storage service 720 may include a data obtaining component 725, an obtained data verification component 730, a data storage component 735, a request receiver 740, a stored data verification component 745, a data providing component 750, or any combination thereof. Each of these components, or components of subcomponents thereof (e.g., one or more processors, one or more memories), may communicate, directly or indirectly, with one another (e.g., via one or more buses).

The data storage service 720 may support data management in accordance with examples as disclosed herein. The data obtaining component 725 may be configured as or otherwise support a means for obtaining, by a blockchain data storage service and from one or more first services that support at least one blockchain node of a blockchain network, data of a data block stored by the blockchain network. The obtained data verification component 730 may be configured as or otherwise support a means for verifying, by the blockchain data storage service and using a plurality of verification algorithms associated with the blockchain network, the data of the data block obtained from the one or more first services. The data storage component 735 may be configured as or otherwise support a means for storing, after verifying the data of the data block obtained from the one or more first services, the data of the data block in a storage location. The request receiver 740 may be configured as or otherwise support a means for receiving, at the blockchain data storage service and from a second service, a request for the data of the data block. The stored data verification component 745 may be configured as or otherwise support a means for verifying, by the blockchain data storage service and using at least one of the plurality of verification algorithms associated with the blockchain network, the data of the data block as stored in the storage location. The data providing component 750 may be configured as or otherwise support a means for providing, after verifying the data of the data block as stored in the storage location, the data of the data block to the second service.

In some examples, to support obtaining the data of the data block, the data obtaining component 725 may be configured as or otherwise support a means for transmitting, to the one or more first services, one or more application programming interface (API) calls configured to extract respective portions of the data block.

In some examples, the blockchain data storage service is managed by a custodial token platform.

In some examples, the one or more first services comprise a first party service that supports a blockchain node that is configured to execute a blockchain protocol associated with the blockchain network.

In some examples, the one or more first services comprise a third party service that supports a blockchain node that is configured to execute a blockchain protocol associated with the blockchain network.

In some examples, to support verifying the data of the data block obtained from the one or more first services, the data of the data block as stored in the storage location, or both, the obtained data verification component 730 may be configured as or otherwise support a means for verifying a header included in the data block. In some examples, to support verifying the data of the data block obtained from the one or more first services, the data of the data block as stored in the storage location, or both, the obtained data verification component 730 may be configured as or otherwise support a means for verifying that the data block is included in a blockchain ledger supported by the blockchain network.

In some examples, to support verifying the header included in the data block, the obtained data verification component 730 may be configured as or otherwise support a means for hashing transaction data of the data block. In some examples, to support verifying the header included in the data block, the obtained data verification component 730 may be configured as or otherwise support a means for verifying that a resulting hash matches a hash value obtained from the header.

In some examples, the data of the data block comprises first data of a first data block, and the data obtaining component 725 may be configured as or otherwise support a means for obtaining, by the blockchain data storage service and from a third service that supports a second blockchain node of a second blockchain network, second data of a second data block stored by the second blockchain network. In some examples, the data of the data block comprises first data of a first data block, and the obtained data verification component 730 may be configured as or otherwise support a means for verifying, by the blockchain data storage service and using a second plurality verification algorithms associated with the second blockchain network, the second data. In some examples, the data of the data block comprises first data of a first data block, and the stored data verification component 745 may be configured as or otherwise support a means for verifying, by the blockchain data storage service, the second data after receiving a second request for the second data using at least one second verification algorithm of the second plurality verification algorithms associated with the second blockchain network storing the second data.

In some examples, the data obtaining component 725 may be configured as or otherwise support a means for periodically obtaining subsequent data blocks to the data block and stored by the blockchain network. In some examples, the obtained data verification component 730 may be configured as or otherwise support a means for verifying, using the plurality of verification algorithms associated with the blockchain network, the data of subsequent data blocks.

Figure 8:
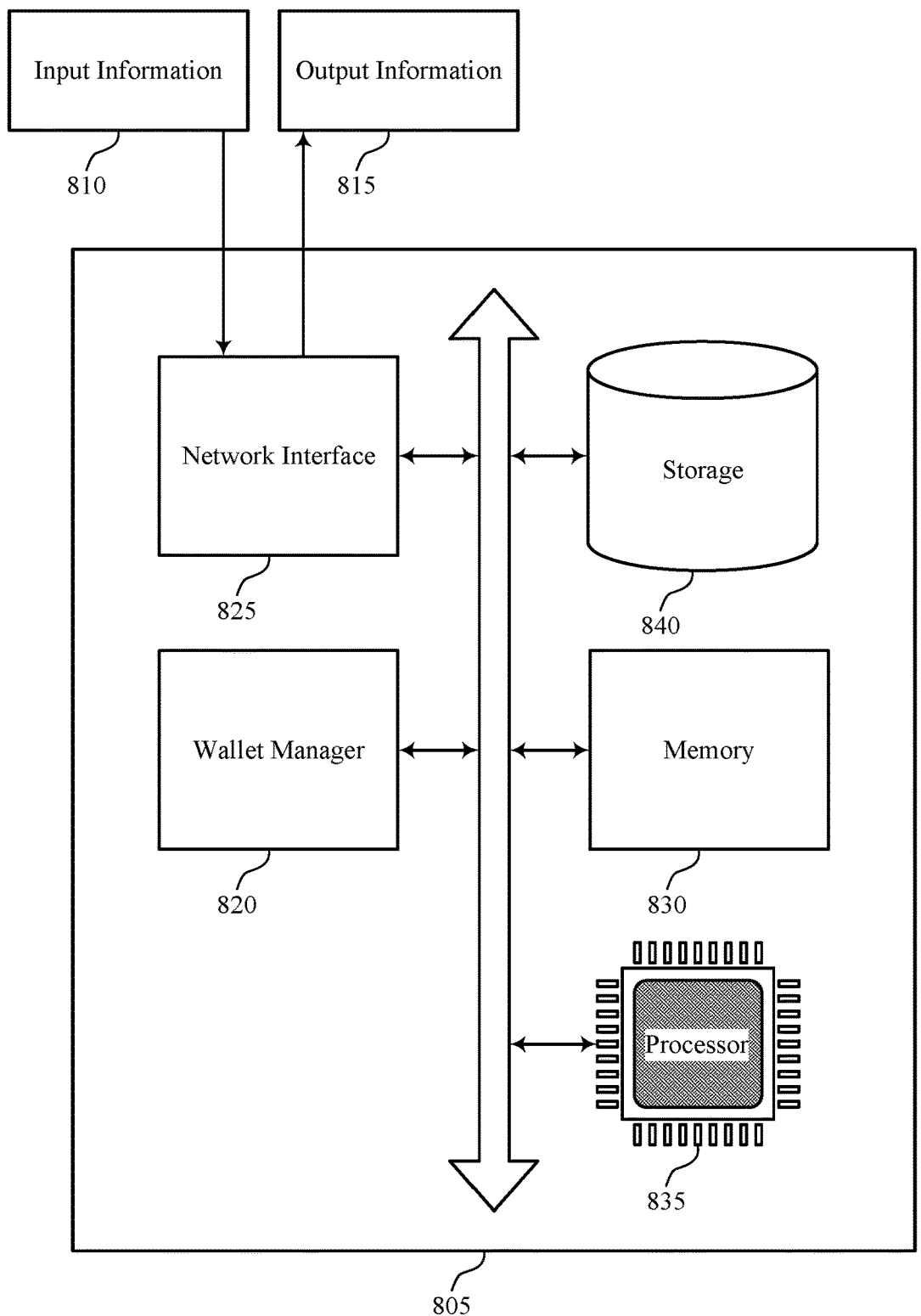
FIG. 8 shows a diagram of a system including a device that supports verifying data integrity of data stored in block-level data storage across multiple blockchains in accordance with aspects of the present disclosure.

FIG. 8 shows a diagram of a system 800 including a device 805 that supports verifying data integrity of data stored in block-level data storage across multiple blockchains in accordance with aspects of the present disclosure. The device 805 may be an example of or include the components of a system 605 as described herein. The device 805 may include components for verifying data integrity, such as a data storage service 820, an input information 810, an output information 815, a network interface 825, at least one memory 830, at least one processor 835, and a storage 840. Each of these components may communicate, directly or indirectly, with one another (e.g., via one or more buses, communications links, communications interfaces, or any combination thereof).

The network interface 825 may enable the device 805 to exchange information (e.g., input information 810, output information 815, or both) with other systems or devices (not shown). For example, the network interface 825 may enable the device 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause at least one processor 835 to perform various functions described herein, such as functions supporting verifying data integrity of data stored in block-level data storage across multiple blockchains. In some cases, the memory 830 may contain, among other things, a basic input/output system (BIOS), which may control basic hardware or software operation such as the interaction with peripheral components or devices. In some cases, the memory 830 may be an example of aspects of one or more components of a custodial token platform 110 as described with reference to FIG. 1. The memory 830 may be an example of a single memory or multiple memories. For example, the device 805 may include one or more memories 830.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in at least one memory 830 to perform various functions (e.g., functions or tasks supporting verifying data integrity of data stored in block-level data storage across multiple blockchains). Though a single processor 835 is depicted in the example of FIG. 8, it is to be understood that the device 805 may include any quantity of one or more of processors 835 and that a group of processors 835 may collectively perform one or more functions ascribed herein to a processor, such as the processor 835. The processor 835 may be an example of a single processor or multiple processors. For example, the device 805 may include one or more processors 835.

Storage 840 may be configured to store data that is generated, processed, stored, or otherwise used by the device 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1.

The data storage service 820 may support data management in accordance with examples as disclosed herein. For example, the data storage service 820 may be configured as or otherwise support a means for obtaining, by a blockchain data storage service and from one or more first services that support at least one blockchain node of a blockchain network, data of a data block stored by the blockchain network. The data storage service 820 may be configured as or otherwise support a means for verifying, by the blockchain data storage service and using a plurality of verification algorithms associated with the blockchain network, the data of the data block obtained from the one or more first services. The data storage service 820 may be configured as or otherwise support a means for storing, after verifying the data of the data block obtained from the one or more first services, the data of the data block in a storage location. The data storage service 820 may be configured as or otherwise support a means for receiving, at the blockchain data storage service and from a second service, a request for the data of the data block. The data storage service 820 may be configured as or otherwise support a means for verifying, by the blockchain data storage service and using at least one of the plurality of verification algorithms associated with the blockchain network, the data of the data block as stored in the storage location. The data storage service 820 may be configured as or otherwise support a means for providing, after verifying the data of the data block as stored in the storage location, the data of the data block to the second service.

By including or configuring the data storage service 820 in accordance with examples as described herein, the device 805 may support techniques for improved security related to data storage. For example, verifying the data during data ingestion and data service may ensure a validity of the data received by the data storage service 820 and ensure that the data stored at a storage location by the data storage service 820 is uncorrupted.

Figure 9:
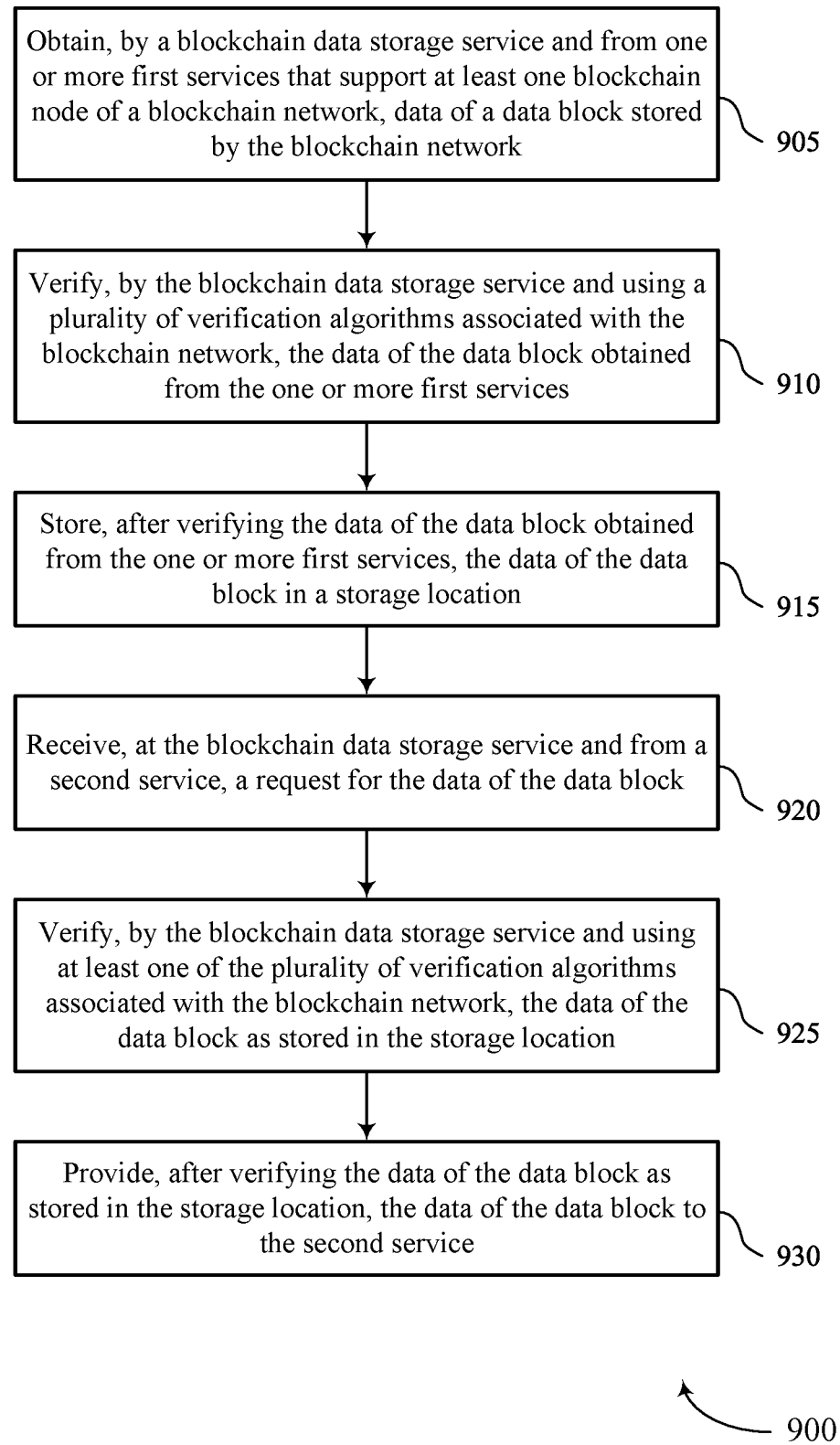
FIGS. 9 and 10 show flowcharts illustrating methods that support verifying data integrity of data stored in block-level data storage across multiple blockchains in accordance with aspects of the present disclosure.

FIG. 9 shows a flowchart illustrating a method 900 that supports verifying data integrity of data stored in block-level data storage across multiple blockchains in accordance with aspects of the present disclosure. The operations of the method 900 may be implemented by a custodial token platform or its components as described herein. For example, the operations of the method 900 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include obtaining, by a blockchain data storage service and from one or more first services that support at least one blockchain node of a blockchain network, data of a data block stored by the blockchain network. The operations of block 905 may be performed in accordance with examples as disclosed herein. In some examples, aspects of the operations of 905 may be performed by a data obtaining component 725 as described with reference to FIG. 7.

At 910, the method may include verifying, by the blockchain data storage service and using a plurality of verification algorithms associated with the blockchain network, the data of the data block obtained from the one or more first services. The operations of block 910 may be performed in accordance with examples as disclosed herein. In some examples, aspects of the operations of 910 may be performed by an obtained data verification component 730 as described with reference to FIG. 7.

At 915, the method may include storing, after verifying the data of the data block obtained from the one or more first services, the data of the data block in a storage location. The operations of block 915 may be performed in accordance with examples as disclosed herein. In some examples, aspects of the operations of 915 may be performed by a data storage component 735 as described with reference to FIG. 7.

At 920, the method may include receiving, at the blockchain data storage service and from a second service, a request for the data of the data block. The operations of block 920 may be performed in accordance with examples as disclosed herein. In some examples, aspects of the operations of 920 may be performed by a request receiver 740 as described with reference to FIG. 7.

At 925, the method may include verifying, by the blockchain data storage service and using at least one of the plurality of verification algorithms associated with the blockchain network, the data of the data block as stored in the storage location. The operations of block 925 may be performed in accordance with examples as disclosed herein. In some examples, aspects of the operations of 925 may be performed by a stored data verification component 745 as described with reference to FIG. 7.

At 930, the method may include providing, after verifying the data of the data block as stored in the storage location, the data of the data block to the second service. The operations of block 930 may be performed in accordance with examples as disclosed herein. In some examples, aspects of the operations of 930 may be performed by a data providing component 750 as described with reference to FIG. 7.

Figure 10:
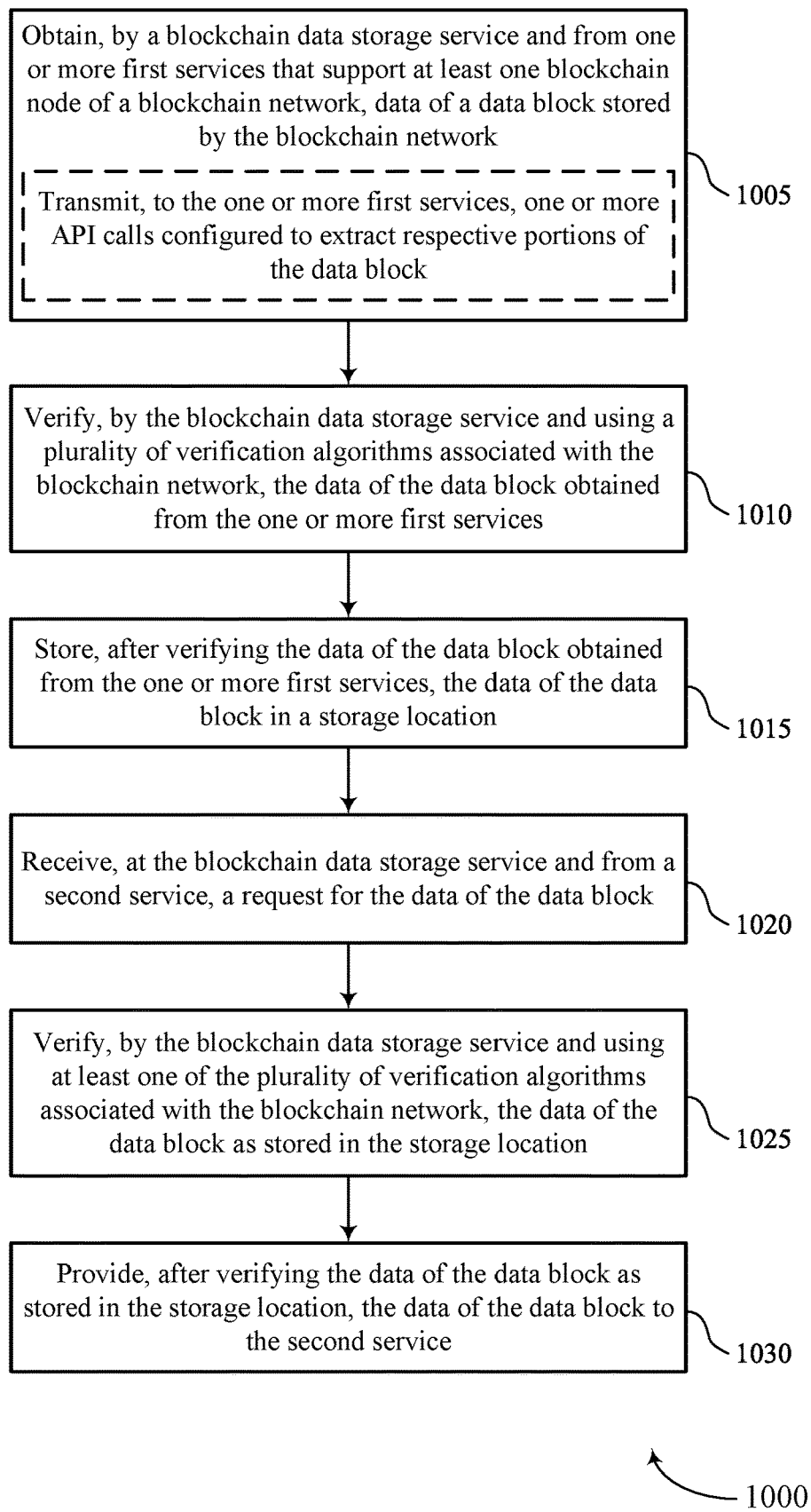

FIG. 10 shows a flowchart illustrating a method 1000 that supports verifying data integrity of data stored in block-level data storage across multiple blockchains in accordance with aspects of the present disclosure. The operations of the method 1000 may be implemented by a custodial token platform or its components as described herein. For example, the operations of the method 1000 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include obtaining, by a blockchain data storage service and from one or more first services that support at least one blockchain node of a blockchain network, data of a data block stored by the blockchain network. Obtaining the data may include transmitting, to the one or more first services, one or more API calls configured to extract respective portions of the data block. The operations of block 1005 may be performed in accordance with examples as disclosed herein. In some examples, aspects of the operations of 1005 may be performed by a data obtaining component 725 as described with reference to FIG. 7.

At 1010, the method may include verifying, by the blockchain data storage service and using a plurality of verification algorithms associated with the blockchain network, the data of the data block obtained from the one or more first services. The operations of block 1010 may be performed in accordance with examples as disclosed herein. In some examples, aspects of the operations of 1010 may be performed by an obtained data verification component 730 as described with reference to FIG. 7.

At 1015, the method may include storing, after verifying the data of the data block obtained from the one or more first services, the data of the data block in a storage location. The operations of block 1015 may be performed in accordance with examples as disclosed herein. In some examples, aspects of the operations of 1015 may be performed by a data storage component 735 as described with reference to FIG. 7.

At 1020, the method may include receiving, at the blockchain data storage service and from a second service, a request for the data of the data block. The operations of block 1025 may be performed in accordance with examples as disclosed herein. In some examples, aspects of the operations of 1020 may be performed by a request receiver 740 as described with reference to FIG. 7.

At 1025, the method may include verifying, by the blockchain data storage service and using at least one of the plurality of verification algorithms associated with the blockchain network, the data of the data block as stored in the storage location. The operations of block 1025 may be performed in accordance with examples as disclosed herein. In some examples, aspects of the operations of 1025 may be performed by a stored data verification component 745 as described with reference to FIG. 7.

At 1030, the method may include providing, after verifying the data of the data block as stored in the storage location, the data of the data block to the second service. The operations of block 1030 may be performed in accordance with examples as disclosed herein. In some examples, aspects of the operations of 1030 may be performed by a data providing component 750 as described with reference to FIG. 7.

A method for data management by an apparatus is described. The method may include obtaining, by a blockchain data storage service and from one or more first services that support at least one blockchain node of a blockchain network, data of a data block stored by the blockchain network, verifying, by the blockchain data storage service and using a plurality of verification algorithms associated with the blockchain network, the data of the data block obtained from the one or more first services, storing, after verifying the data of the data block obtained from the one or more first services, the data of the data block in a storage location, receiving, at the blockchain data storage service and from a second service, a request for the data of the data block, verifying, by the blockchain data storage service and using at least one of the plurality of verification algorithms associated with the blockchain network, the data of the data block as stored in the storage location, and providing, after verifying the data of the data block as stored in the storage location, the data of the data block to the second service.

An apparatus for data management is described. The apparatus may include one or more memories storing processor executable code, and one or more processors coupled with the one or more memories. The one or more processors may individually or collectively operable to execute the code to cause the apparatus to obtain, by a blockchain data storage service and from one or more first services that support at least one blockchain node of a blockchain network, data of a data block stored by the blockchain network, verifying, by the blockchain data storage service and used a plurality of verification algorithms associated with the blockchain network, the data of the data block obtained from the one or more first services, store, after verifying the data of the data block obtained from the one or more first services, the data of the data block in a storage location, receive, at the blockchain data storage service and from a second service, a request for the data of the data block, verifying, by the blockchain data storage service and using at least one of the plurality of verification algorithms associated with the blockchain network, the data of the data block as stored in the storage location, and provide, after verifying the data of the data block as stored in the storage location, the data of the data block to the second service.

Another apparatus for data management is described. The apparatus may include means for obtaining, by a blockchain data storage service and from one or more first services that support at least one blockchain node of a blockchain network, data of a data block stored by the blockchain network, means for verifying, by the blockchain data storage service and using a plurality of verification algorithms associated with the blockchain network, the data of the data block obtained from the one or more first services, means for storing, after verifying the data of the data block obtained from the one or more first services, the data of the data block in a storage location, means for receiving, at the blockchain data storage service and from a second service, a request for the data of the data block, means for verifying, by the blockchain data storage service and using at least one of the plurality of verification algorithms associated with the blockchain network, the data of the data block as stored in the storage location, and means for providing, after verifying the data of the data block as stored in the storage location, the data of the data block to the second service.

A non-transitory computer-readable medium storing code for data management is described. The code may include instructions executable by one or more processors to obtain, by a blockchain data storage service and from one or more first services that support at least one blockchain node of a blockchain network, data of a data block stored by the blockchain network, verifying, by the blockchain data storage service and used a plurality of verification algorithms associated with the blockchain network, the data of the data block obtained from the one or more first services, store, after verifying the data of the data block obtained from the one or more first services, the data of the data block in a storage location, receive, at the blockchain data storage service and from a second service, a request for the data of the data block, verifying, by the blockchain data storage service and using at least one of the plurality of verification algorithms associated with the blockchain network, the data of the data block as stored in the storage location, and provide, after verifying the data of the data block as stored in the storage location, the data of the data block to the second service.

In some examples of the method, apparatus, and non-transitory computer-readable medium described herein, obtaining the data of the data block may include operations, features, means, or instructions for transmitting, to the one or more first services, one or more API calls configured to extract respective portions of the data block.

In some examples of the method, apparatus, and non-transitory computer-readable medium described herein, the blockchain data storage service may be managed by a custodial token platform.

In some examples of the method, apparatus, and non-transitory computer-readable medium described herein, the one or more first services comprise a first party service that supports a blockchain node that may be configured to execute a blockchain protocol associated with the blockchain network.

In some examples of the method, apparatus, and non-transitory computer-readable medium described herein, the one or more first services comprise a third party service that supports a blockchain node that may be configured to execute a blockchain protocol associated with the blockchain network.

In some examples of the method, apparatus, and non-transitory computer-readable medium described herein, verifying the data of the data block obtained from the one or more first services, the data of the data block as stored in the storage location, or both may include operations, features, means, or instructions for verifying a header included in the data block and verifying that the data block may be included in a blockchain ledger supported by the blockchain network.

In some examples of the method, apparatus, and non-transitory computer-readable medium described herein, verifying the header included in the data block may include operations, features, means, or instructions for hashing transaction data of the data block and verifying that a resulting hash matches a hash value obtained from the header.

In some examples of the method, apparatus, and non-transitory computer-readable medium described herein, the data of the data block comprises first data of a first data block and the method, apparatuses, and non-transitory computer-readable medium may include further operations, features, means, or instructions for obtaining, by the blockchain data storage service and from a third service that supports a second blockchain node of a second blockchain network, second data of a second data block stored by the second blockchain network, verifying, by the blockchain data storage service and using a second plurality verification algorithms associated with the second blockchain network, the second data, and verifying, by the blockchain data storage service, the second data after receiving a second request for the second data using at least one second verification algorithm of the second plurality verification algorithms associated with the second blockchain network storing the second data.

In some examples of the method, apparatus, and non-transitory computer-readable medium described herein, periodically obtaining subsequent data blocks to the data block and stored by the blockchain network and verifying, using the plurality of verification algorithms associated with the blockchain network, the data of subsequent data blocks.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a"

using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   obtaining, by a blockchain data storage service and from one or more first services that support at least one blockchain node of a blockchain network, data of a data block stored by the blockchain network;
   verifying, by the blockchain data storage service and using a plurality of verification algorithms associated with the blockchain network, the data of the data block obtained from the one or more first services;
   storing, after verifying the data of the data block obtained from the one or more first services, the data of the data block in a storage location;
   receiving, at the blockchain data storage service and from a second service, a request for the data of the data block;
   verifying, by the blockchain data storage service and using at least one of the plurality of verification algorithms associated with the blockchain network, the data of the data block as stored in the storage location; and
   providing, after verifying the data of the data block as stored in the storage location, the data of the data block to the second service.

2. The method of claim 1, wherein obtaining the data of the data block comprises:
   transmitting, to the one or more first services, one or more application programming interface (API) calls configured to extract respective portions of the data block.

3. The method of claim 1, wherein the blockchain data storage service is managed by a custodial token platform.

4. The method of claim 1, wherein the one or more first services comprise a first party service that supports a blockchain node that is configured to execute a blockchain protocol associated with the blockchain network.

5. The method of claim 1, wherein the one or more first services comprise a third party service that supports a blockchain node that is configured to execute a blockchain protocol associated with the blockchain network.

6. The method of claim 1, wherein verifying the data of the data block obtained from the one or more first services, the data of the data block as stored in the storage location, or both comprises:
   verifying a header included in the data block; and
   verifying that the data block is included in a blockchain ledger supported by the blockchain network.

7. The method of claim 6, wherein verifying the header included in the data block comprises:
   hashing transaction data of the data block; and
   verifying that a resulting hash matches a hash value obtained from the header.

8. The method of claim 1, wherein the blockchain network comprises a first blockchain network and wherein the data of the data block comprises first data of a first data block, the method further comprising:
   obtaining, by the blockchain data storage service and from a third service that supports a second blockchain node of a second blockchain network, second data of a second data block stored by the second blockchain network;
   verifying, by the blockchain data storage service and using a second plurality verification algorithms associated with the second blockchain network, the second data; and
   verifying, by the blockchain data storage service, the second data after receiving a second request for the second data using at least one second verification algorithm of the second plurality verification algorithms associated with the second blockchain network storing the second data.

9. The method of claim 1, further comprising:
   periodically obtaining subsequent data blocks to the data block and stored by the blockchain network; and
   verifying, using the plurality of verification algorithms associated with the blockchain network, the data of subsequent data blocks.

10. An apparatus for data management, comprising:
    one or more memories storing processor-executable code; and
    one or more processors coupled with the one or more memories and individually or collectively operable to execute the code to cause the apparatus to:
       obtain, by a blockchain data storage service and from one or more first services that support at least one blockchain node of a blockchain network, data of a data block stored by the blockchain network;
       verify, by the blockchain data storage service and used a plurality of verification algorithms associated with the blockchain network, the data of the data block obtained from the one or more first services;

store, after verifying the data of the data block obtained from the one or more first services, the data of the data block in a storage location;

receive, at the blockchain data storage service and from a second service, a request for the data of the data block;

verify, by the blockchain data storage service and using at least one of the plurality of verification algorithms associated with the blockchain network, the data of the data block as stored in the storage location; and provide, after verifying the data of the data block as stored in the storage location, the data of the data block to the second service.

11. The apparatus of claim 10, wherein, to obtain the data of the data block, the one or more processors are individually or collectively operable to execute the code to cause the apparatus to:

transmit, to the one or more first services, one or more application programming interface (API) calls configured to extract respective portions of the data block.

12. The apparatus of claim 10, wherein the blockchain data storage service is managed by a custodial token platform.

13. The apparatus of claim 10, wherein the one or more first services comprise a first party service that supports a blockchain node that is configured to execute a blockchain protocol associated with the blockchain network.

14. The apparatus of claim 10, wherein the one or more first services comprise a third party service that supports a blockchain node that is configured to execute a blockchain protocol associated with the blockchain network.

15. The apparatus of claim 10, wherein, to verify the data of the data block obtained from the one or more first services, the data of the data block as stored in the storage location, or both, the one or more processors are individually or collectively operable to execute the code to cause the apparatus to:

verify a header included in the data block; and verify that the data block is included in a blockchain ledger supported by the blockchain network.

16. The apparatus of claim 15, wherein, to verify the header included in the data block, the one or more processors are individually or collectively operable to execute the code to cause the apparatus to:

hash transaction data of the data block; and verify that a resulting hash matches a hash value obtained from the header.

17. The apparatus of claim 10, wherein the data of the data block comprises first data of a first data block, and the one or more processors are individually or collectively further operable to execute the code to cause the apparatus to:

obtain, by the blockchain data storage service and from a third service that supports a second blockchain node of a second blockchain network, second data of a second data block stored by the second blockchain network;

verify, by the blockchain data storage service and used a second plurality verification algorithms associated with the second blockchain network, the second data; and verify, by the blockchain data storage service, the second data after receiving a second request for the second data using at least one second verification algorithm of the second plurality verification algorithms associated with the second blockchain network storing the second data.

18. The apparatus of claim 10, wherein the one or more processors are individually or collectively further operable to execute the code to cause the apparatus to:

periodically obtain subsequent data blocks to the data block and stored by the blockchain network; and verify, using the plurality of verification algorithms associated with the blockchain network, the data of subsequent data blocks.

19. A non-transitory computer-readable medium storing code for data management, the code comprising instructions executable by one or more processors to:

obtain, by a blockchain data storage service and from one or more first services that support at least one blockchain node of a blockchain network, data of a data block stored by the blockchain network;

verify, by the blockchain data storage service and used a plurality of verification algorithms associated with the blockchain network, the data of the data block obtained from the one or more first services;

store, after verifying the data of the data block obtained from the one or more first services, the data of the data block in a storage location;

receive, at the blockchain data storage service and from a second service, a request for the data of the data block;

verify, by the blockchain data storage service and using at least one of the plurality of verification algorithms associated with the blockchain network, the data of the data block as stored in the storage location; and provide, after verifying the data of the data block as stored in the storage location, the data of the data block to the second service.

20. The non-transitory computer-readable medium of claim 19, wherein the instructions to obtain the data of the data block are executable by the one or more processors to:

transmit, to the one or more first services, one or more application programming interface (API) calls configured to extract respective portions of the data block.

* * * * *